(12) United States Patent
Kim

(10) Patent No.: US 12,401,205 B2
(45) Date of Patent: Aug. 26, 2025

(54) ELECTRONIC APPARATUS AND CHARGING METHOD THEREOF

(71) Applicant: Samsung Electronics Co., Ltd., Suwon-si (KR)

(72) Inventor: Youngjae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/760,603

(22) Filed: Jul. 1, 2024

(65) Prior Publication Data
US 2024/0356343 A1    Oct. 24, 2024

Related U.S. Application Data

(63) Continuation of application No. 17/837,572, filed on Jun. 10, 2022, now Pat. No. 12,057,718, which is a continuation of application No. 16/879,972, filed on May 21, 2020, now Pat. No. 11,424,627.

(30) Foreign Application Priority Data

Nov. 26, 2019    (KR) .................. 10-2019-0153287

(51) Int. Cl.
H02J 7/00        (2006.01)
(52) U.S. Cl.
CPC .......... H02J 7/0013 (2013.01); H02J 7/0047 (2013.01); H02J 7/007182 (2020.01)
(58) Field of Classification Search
USPC ...................................................... 320/118
See application file for complete search history.

(56) References Cited

U.S. PATENT DOCUMENTS

| | | |
|---|---|---|
| 4,081,738 A | 3/1978 | Roller |
| 4,413,220 A | 11/1983 | Waineo |
| 5,576,608 A * | 11/1996 | Nagai .................. H02J 7/0019 320/159 |
| 7,879,485 B2 | 2/2011 | Yoon et al. |
| 8,117,857 B2 | 2/2012 | Kelty et al. |
| 8,508,191 B2 | 8/2013 | Kim et al. |
| 8,618,775 B2 | 12/2013 | Hermann et al. |
| 8,624,560 B2 | 1/2014 | Ungar et al. |
| 8,961,203 B2 | 2/2015 | Lee |

(Continued)

FOREIGN PATENT DOCUMENTS

| | | |
|---|---|---|
| CN | 104022542 A | 9/2014 |
| CN | 105471001 A | 4/2016 |

(Continued)

OTHER PUBLICATIONS

ESR issued on Dec. 15, 2020 corresponds in European Patent Application No. 20191254.0 (8 pages in English).

(Continued)

*Primary Examiner* — Samuel Berhanu
(74) *Attorney, Agent, or Firm* — NSIP Law

(57) ABSTRACT

An electronic apparatus may include: batteries; a charger configured to charge the batteries; a switch network electrically connected to the batteries; and a charging controller configured to control the switch network to change a connection relationship between the batteries and to control the charger to charge the batteries while the batteries are in the changed connection relationship.

10 Claims, 8 Drawing Sheets

(56) References Cited

U.S. PATENT DOCUMENTS

| | | |
|---|---|---|
| 8,972,213 B2 | 3/2015 | Zhang et al. |
| 9,590,436 B2 | 3/2017 | Sporck et al. |
| 2005/0052155 A1* | 3/2005 | Surig .................... H02J 7/0048 320/116 |
| 2007/0120531 A1* | 5/2007 | Huh .................. H02J 7/007182 320/130 |
| 2009/0167091 A1 | 7/2009 | Popescu-Stanesti et al. |
| 2012/0139482 A1 | 6/2012 | Zhang et al. |
| 2014/0239896 A1 | 8/2014 | Takeshita |
| 2014/0285147 A1* | 9/2014 | Sawada .................. H02J 7/007 320/109 |
| 2015/0236528 A1 | 8/2015 | Kim et al. |
| 2017/0005489 A1 | 1/2017 | Kwon et al. |
| 2017/0222463 A1* | 8/2017 | Pullen ....................... H02J 7/04 |
| 2017/0294790 A1 | 10/2017 | Tian et al. |
| 2018/0316198 A1* | 11/2018 | Niizuma .................. H02J 50/10 |
| 2018/0328995 A1 | 11/2018 | Kondo |
| 2019/0023142 A1 | 1/2019 | Cerochi et al. |
| 2019/0126761 A1 | 5/2019 | Verbridge |
| 2019/0214832 A1* | 7/2019 | Li ......................... H02J 7/0024 |
| 2019/0214833 A1 | 7/2019 | Li et al. |
| 2021/0078429 A1* | 3/2021 | Li ........................... B60L 58/21 |

FOREIGN PATENT DOCUMENTS

| | | |
|---|---|---|
| CN | 108475931 A | 8/2018 |
| CN | 108964184 A | 12/2018 |
| JP | 9-252528 A | 9/1997 |
| KR | 10-2011-0075365 A | 7/2011 |
| KR | 10-2013-0142312 A | 12/2013 |
| KR | 10-2016-0110023 A | 9/2016 |
| KR | 10-2017-0049500 A | 5/2017 |
| KR | 10-2017-0054851 A | 5/2017 |
| KR | 10-2018-0035009 A | 4/2018 |
| KR | 10-2018-0040487 A | 4/2018 |
| KR | 10-2019-0051483 A | 5/2019 |

OTHER PUBLICATIONS

Korean Office Action issued on Dec. 4, 2024, in corresponding Korean Patent Application No. 10-2019-0153287. (3pages in English, 7pages in Korean).

Chinese Office Action Issued on Mar. 4, 2025, in Counterpart Chinese Patent Application No. 202010493483.9 (12 Pages in English, 7 Pages in Chinese).

* cited by examiner

ELECTRONIC APPARATUS AND CHARGING METHOD THEREOF

CROSS-REFERENCE TO RELATED APPLICATIONS

This application is a continuation of U.S. patent application Ser. No. 17/837,572 filed on Jun. 10, 2022 which is a continuation of U.S. patent application Ser. No. 16/879,972 filed on May 21, 2020 which claims the benefit under 35 USC § 119 (a) of Korean Patent Application No. 10-2019-0153287, filed on Nov. 26, 2019, in the Korean Intellectual Property Office, the entire disclosures of which are incorporated herein by reference for all purposes.

BACKGROUND

1. Field

The following description relates to an electronic apparatus and a method of charging an electronic apparatus.

2. Description of Related Art

Recently, use of portable electronic devices such as smartphones and tablet personal computers (PCs) has been increasing. Such electronic devices may perform various functions. For example, various functions such as a voice communication, an Internet search, and an image playback may be performed in the electronic devices. Thus, an amount of power consumed by a battery may increase, and accordingly a capacity of the battery may also be increased to increase a time to use an electronic device.

Also, a demand for fast charging of a battery having a high capacity is also increasing based on usage patterns of users of a portable electronic devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic apparatus includes: batteries; a charger configured to charge the batteries; a switch network electrically connected to the batteries; and a charging controller configured to control the switch network to change a connection relationship between the batteries and to control the charger to charge the batteries while the batteries are in the changed connection relationship.

In a high-voltage charging mode, the charging controller may be configured to control the switch network to change the connection relationship from a parallel connection relationship to a series connection relationship, and to control the charger to charge the batteries, while the batteries are in the series connection relationship, with a voltage set to correspond to the high-voltage charging mode. In a low-voltage charging mode, the charging controller may be configured to maintain the connection relationship as the parallel connection relationship, and to control the charger to charge the batteries, while the batteries are in the parallel connection relationship, with a voltage set to correspond to the low-voltage charging mode.

The charging controller may be further configured to determine a charging mode to be a high-voltage charging mode in response to an output voltage value of a power supplier being greater than or equal to a threshold voltage, and to determine the charging mode to be a low-voltage charging mode in response to the output voltage value being less than the threshold voltage.

The charging controller may be further configured to determine a required voltage value for the charger based on the output voltage value and to control the charger based on the determined required voltage value.

The charging controller may be further configured to calculate a required charging current value based on either one or both of an output voltage value of a power supplier and a usage pattern of a user, and to determine a charging mode based on the calculated required charging current value, in response to the output voltage value being greater than or equal to a threshold voltage.

The charging controller may be further configured to determine the charging mode to be a high-voltage charging mode in response to the calculated required charging current value being greater than or equal to a threshold current, and to determine the charging mode to be a low-voltage charging mode in response to the calculated required charging current value being less than the threshold current.

The charging controller may be further configured to determine an output voltage value of a power supplier based on information about an output voltage range of the power supplier and maximum charging efficiency information for each of output voltages in the output voltage range, to calculate a required charging current value based on the determined output voltage value, and to determine a charging mode based on either one or both of the determined output voltage value and the calculated required charging current value.

The charging controller may be further configured to determine the charging mode to be a low-voltage charging mode in response to the determined output voltage value being less than a threshold voltage, to determine the charging mode to be the low-voltage charging mode in response to the determined output voltage value being greater than or equal to the threshold voltage and the calculated required charging current value being less than a threshold current, and to determine the charging mode to be a high-voltage charging mode in response to the determined output voltage value being greater than or equal to the threshold voltage and the calculated required charging current value being greater than or equal to the threshold current.

The electronic apparatus may further include: a first switch configured to electrically connect the charger and a load; and a second switch configured to electrically connect the charger to the batteries.

The charging controller may be further configured to control the first switch to interrupt an electrical connection between the charger and the load in a high-voltage charging mode.

In another general aspect, a method of charging an electronic apparatus includes: controlling a switch network electrically connected to batteries to change a connection relationship between the batteries; and controlling a charger to charge the batteries while the batteries are in the changed connection relationship.

The controlling of the switch network may include maintaining the connection relationship as a parallel connection relationship in a low-voltage charging mode, and controlling the switch network to change the connection relationship from the parallel connection relationship to a series connection relationship in a high-voltage charging mode. The controlling of the charger may include controlling the charger to charge the batteries, while the batteries are in the parallel connection relationship, with a voltage set to correspond to the low-voltage charging mode in the low-voltage charging mode, and controlling the charger to charge the batteries, while the batteries are in the series connection relationship, with a voltage set to correspond to the high-voltage charging mode in the high-voltage charging mode.

The method may further include: determining a charging mode to be a high-voltage charging mode in response to an output voltage value of a power supplier being greater than or equal to a threshold voltage; and determining the charging mode to be a low-voltage charging mode in response to the output voltage value being less than the threshold voltage.

The controlling of the charger may include determining a required voltage value for the charger based on the output voltage value, and controlling the charger based on the determined required voltage value.

The method may further include: calculating a required charging current value based on either one or both of an output voltage value of a power supplier and a usage pattern of a user; and determining a charging mode based on the calculated required charging current value, in response to the output voltage value being greater than or equal to a threshold voltage.

The charging mode may include determining the charging mode to be a high-voltage charging mode in response to the calculated required charging current value being greater than or equal to a threshold current, and determining the charging mode to be a low-voltage charging mode in response to the calculated required charging current value being less than the threshold current.

The method may further include: determining an output voltage value of a power supplier based on information about an output voltage range of the power supplier and maximum charging efficiency information for each of output voltages in the output voltage range; calculating a required charging current value based on the determined output voltage value; and determining a charging mode based on either one or both of the determined output voltage value and the calculated required charging current value.

The determining of the charging mode may include determining the charging mode to be a low-voltage charging mode in response to the determined output voltage value being less than a threshold voltage, determining the charging mode to be the low-voltage charging mode in response to the determined output voltage value being greater than or equal to the threshold voltage and the calculated required charging current value being less than a threshold current, and determining the charging mode to be a high-voltage charging mode in response to the determined output voltage value being greater than or equal to the threshold voltage and the calculated required charging current value being greater than or equal to the threshold current.

The method may further include: controlling a switch to interrupt an electrical connection between the charger and a load in a high-voltage charging mode.

In another general aspect, a non-transitory computer-readable storage medium stores instructions that, when executed by a processor, cause the processor to perform the method described above.

In another general aspect, a method of charging an electronic apparatus includes: determining a charging mode of the electronic apparatus in response to the electronic apparatus being connected to a power supplier; and charging batteries in the determined charging mode. The batteries are connected in parallel before the electronic apparatus is connected to the power supplier. The charging of the batteries includes: charging the batteries, while the batteries are connected in parallel, in response to the charging mode being determined to be a first charging mode; and changing a connection relationship between the batteries such that the batteries are connected in series and charging the batteries while the batteries are connected in series, in response to the charging mode being determined to be a second charging mode.

Other features and aspects will be apparent from the following detailed description, the drawings, and the claims.

Figure 1:
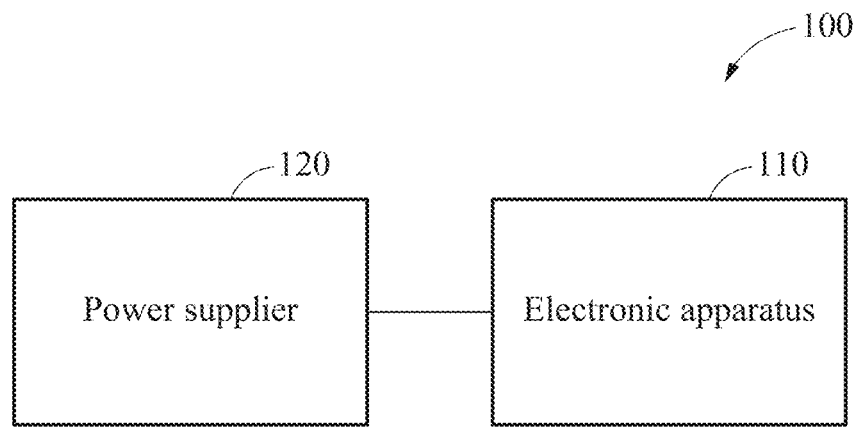
FIG. 1 illustrates an example of a charging system.

Throughout the drawings and the detailed description, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of a charging system 100.

Referring to FIG. 1, the charging system 100 includes an electronic apparatus 110 and a power supplier 120.

The electronic apparatus 110 may be, for example, a mobile electronic apparatus or a portable electronic apparatus. For example, the electronic apparatus 110 may be, but is not limited to, a smartphone or a tablet personal computer (PC). The electronic apparatus 110 may be referred to as, for example, a user terminal, user equipment or a wireless communication apparatus.

The electronic apparatus 110 is connected to the power supplier 120. In an example, the power supplier 120 may be an adapter, and the electronic apparatus 110 may be connected to the adapter via a cable. In another example, the power supplier 120 may be a wireless power transmitter, and the electronic apparatus 110 may form an electromagnetic coupling with the wireless power transmitter and may receive wireless power from the wireless power transmitter.

The electronic apparatus 110 includes a plurality of batteries. When power is received from the power supplier 120, the electronic apparatus 110 may charge the batteries. In an example, in a low-voltage charging mode, the electronic apparatus 110 may charge batteries while the batteries are connected to each other in parallel. In a high-voltage charging mode, the electronic apparatus 110 may change a connection relationship between the batteries from a parallel connection relationship to a series connection relationship and may charge the batteries. In other words, in the high-voltage charging mode, the electronic apparatus 110 may charge the batteries while the batteries are connected in series. Thus, the electronic apparatus 110 may perform a fast charging by increasing a voltage instead of increasing a current, and it is therefore possible to prevent heat from being generated by a conduction loss caused by a current, and possible to perform charging with a high efficiency.

Figure 2:
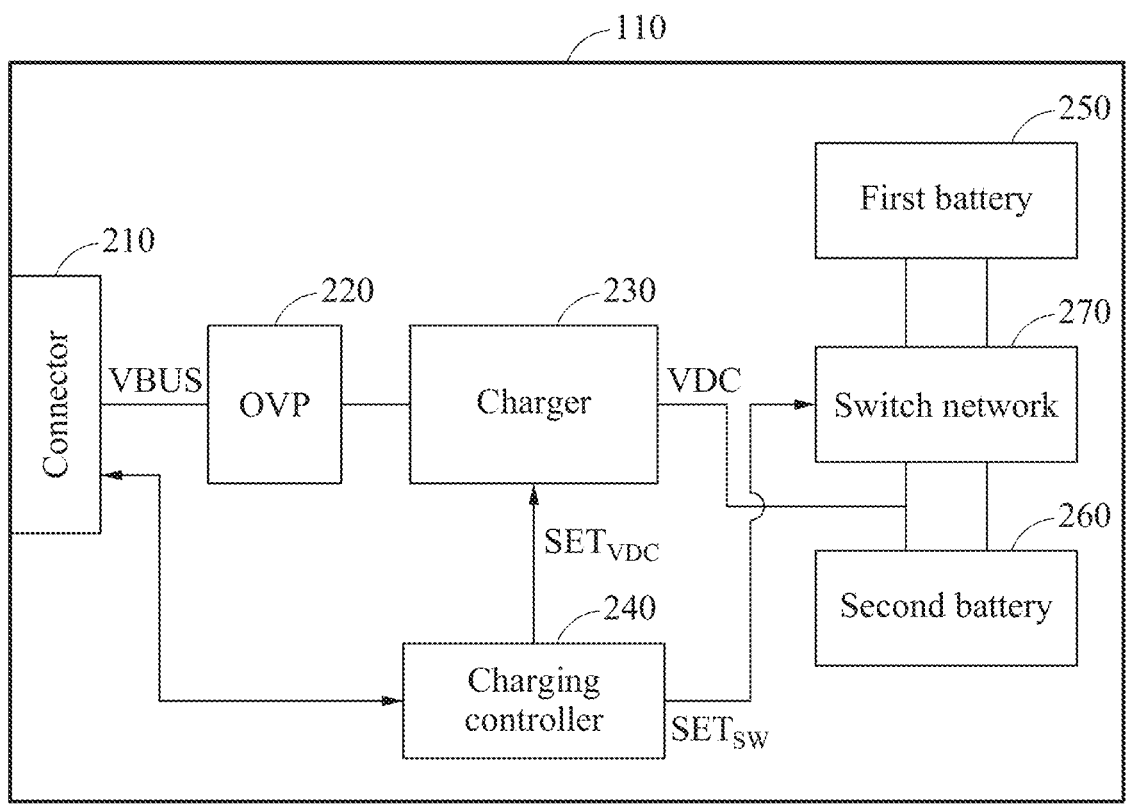
FIG. 2 illustrates an example of an operation of an electronic apparatus.

FIG. 2 illustrates an example of an operation of the electronic apparatus 110.

Referring to FIG. 2, the electronic apparatus 110 may include, for example, a connector 210, an overvoltage protector (OVP) 220, a charger 230, a charging controller 240, a first battery 250, a second battery 260, and a switch network 270. In the example of FIG. 2, the electronic apparatus 110 includes two batteries, that is, the first battery 250 and the second battery 260. However, the number of batteries provided in FIG. 2 is merely an example. For example, the electronic apparatus 110 may include three or more batteries.

The connector 210 may be connected to a cable of the power supplier 120. The connector 210 may include, but is not limited to, for example, a universal serial bus (USB) type C port.

When the connector 210 is connected to the cable of the power supplier 120, the charging controller 240 may control either one or both of the switch network 270 and the charger 230. In an example, the charging controller 240 determines a charging mode to be a high-voltage charging mode. The first battery 250 and the second battery 260 are connected in parallel before the connector 210 is connected to the cable of the power supplier 120, and the charging controller 240 controls the switch network 270 such that a connection relationship between the first battery 250 and the second battery 260 is changed from a parallel connection relationship to a series connection relationship in the high-voltage charging mode. Also, the charging controller 240 controls the charger 230 to charge the first battery 250 and the second battery 260, which are configured in the series connection relationship, with a voltage set to correspond to the high-voltage charging mode.

In another example, the charging controller 240 determines the charging mode to be a low-voltage charging mode. Since the first battery 250 and the second battery 260 are connected in parallel before the connector 210 is connected to the cable of the power supplier 120, the charging controller 240 maintains the connection parallel relationship between the first battery 250 and the second battery 260 in the low-voltage charging mode. Also, the charging controller 240 controls the charger 230 to charge the first battery 250 and the second battery 260, which are configured in the parallel connection relationship, with a voltage set to correspond to the low-voltage charging mode. The charging controller 240 will be further described below with reference to FIG. 3.

The power supplier 120 outputs or supplies power to the electronic apparatus 110, and the power is transmitted to the OVP 220 through the connector 210.

When a voltage VBUS of the power of the power supplier 120 is less than a predetermined level, the OVP 220 may output the power to the charger 230. When the voltage VBUS of the power of the power supplier 120 is greater than or equal to the predetermined level, the OVP 220 may turn off a switch included in the OVP 220 to prevent the power from being output from the OVP 220. Thus, the electronic apparatus 110 or at least one circuit in the electronic apparatus 110 may be protected from power of overvoltage.

The OVP 220 may include, for example, an overvoltage protection circuit.

The charger 230 converts the power output from the OVP 220. For example, the charger 230 may include a step-down direct current (DC)-to-DC (DC/DC) converter, and the step-down DC/DC converter may convert or step down the voltage VBUS of the power output from the OVP 220 to a voltage VDC.

The charger 230 charges the first battery 250 and the second battery 260 with the converted power. For example, the charger 230 may charge the first battery 250 and the second battery 260 that are connected in series in the high-voltage charging mode with a voltage set to correspond to the high-voltage charging mode, and may charge the first battery 250 and the second battery 260 that are connected in parallel in the low-voltage charging mode with a voltage set to correspond to the low-voltage charging mode.

When the first battery 250 and the second battery 260 are fully charged or charging is terminated in the high-voltage charging mode, the charging controller 240 may control the switch network 270 such that the first battery 250 and the second battery 260 may be connected in parallel.

Figure 3:
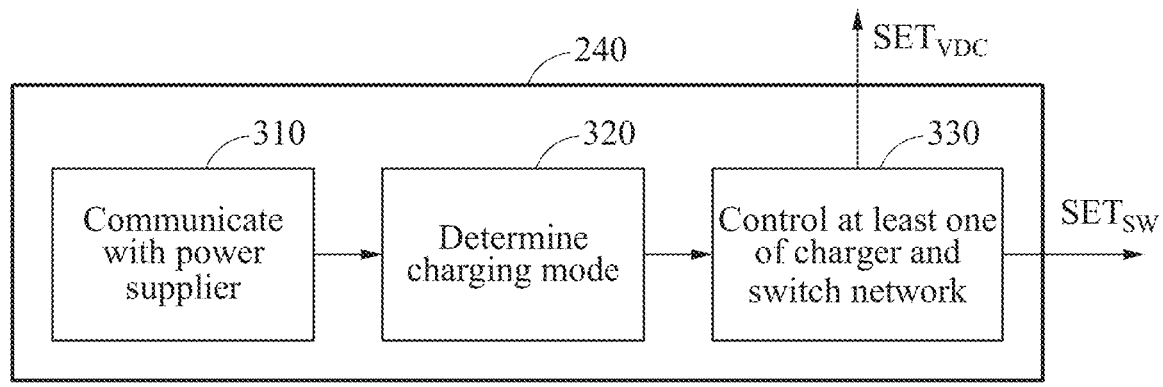
FIG. 3 illustrates an example of operations performed by a charging controller in an electronic apparatus.

FIG. 3 illustrates an example of operations performed by the charging controller 240 in the electronic apparatus 110.

Referring to FIG. 3, in operation 310, the charging controller 240 communicates with the power supplier 120. For example, when the connector 210 is connected to the cable of the power supplier 120, the charging controller 240 may receive information about the power supplier 120 from the power supplier 120 via ports (for example, CC1 and CC2 ports or D+ and D-ports) included in the connector 210. The information about the power supplier 120 may include, but is not limited to, for example, information about an output voltage range of the power supplier 120.

In operation 320, the charging controller 240 determines a charging mode in response to a communication with the power supplier 120.

For example, the charging controller 240 determines an output voltage value of the power supplier 120 based on at least one of a state of the electronic apparatus 110 and the output voltage range of the power supplier 120, and determines the charging mode. In an example, when the electronic apparatus 110 needs to be fast charged and when the power supplier 120 is capable of outputting power of a high voltage (for example, at least 10 volts (V)), the charging controller 240 may determine the output voltage value of the power supplier 120 to be greater than or equal to a threshold voltage (for example, 10 V). In this example, since the output voltage value of the power supplier 120 is determined to be greater than or equal to the threshold voltage, and the charging controller 240 may determine the charging mode to be the high-voltage charging mode. In another example, when the electronic apparatus 110 needs to be fast charged but the power supplier 120 is not capable of outputting power of a high voltage, the charging controller 240 may determine the output voltage value of the power supplier 120 to be less than the threshold voltage. In this example, since the output voltage value of the power supplier 120 is determined to be less than the threshold voltage, the charging controller 240 may determine the charging mode to be the low-voltage charging mode. In still another example, when the electronic apparatus 110 needs to be charged but does not need to be fast charged, the charging controller 240 may determine the output voltage value of the power supplier 120 to be less than the threshold voltage and may determine the charging mode to be the low-voltage charging mode.

In still another example, the charging controller 240 may determine the charging mode based on at least one of a required charging current value and the output voltage value of the power supplier 120. For example, the charging controller 240 may determine the output voltage value of the power supplier 12 as described above. In this example, when the determined output voltage value is less than the threshold voltage, the charging controller 240 may determine the charging mode to be the low-voltage charging mode. When the determined output voltage value is greater than or equal to the threshold voltage, the charging controller 240 may calculate a required charging current value based on at least one of the determined output voltage value and a usage pattern of a user. When the usage pattern of the user indicates that the user is using the electronic apparatus 110, for example, calling or watching a video, during charging, a required charging current value may be calculated to be relatively high. When the calculated required charging current value is greater than or equal to a threshold current (for example, 3 amperes (A)), the charging controller 240 may determine the charging mode to be the high-voltage charging mode. When the calculated required charging current value is less than the threshold current, the charging controller 240 may determine the charging mode to be the low-voltage charging mode.

In still another example, the charging controller 240 may determine the required charging current value and the output voltage value of the power supplier 120 based on information about the output voltage range of the power supplier 120 and maximum charging efficiency information for each voltage, and may determine the charging mode based on the determined required charging current value and the determined output voltage value. Table 1 shows an example of the maximum charging efficiency information for each voltage below.

TABLE 1

| Voltage (V) | Maximum charging efficiency |
|---|---|
| V1(V) | a_V1(%) |
| V2(V) | a_V2(%) |
| V3(V) | a_V3(%) |
| ... | ... |
| V8(V) | a_V3(%) |
| ... | ... |
| Vn(V) | a_Vn(%) |

For example, when a maximum output voltage of the power supplier 120 is V8, the charging controller 240 may search for the highest value from a maximum charging efficiency a_V1 mapped to a voltage V1(V) through a maximum charging efficiency a_V8 mapped to a voltage V8(V). When a maximum charging efficiency a_V6 is the highest value among the maximum charging efficiencies a_V1 through a_V8, the charging controller 240 may determine a voltage V6 mapped to the maximum charging efficiency a_V6 as an output voltage value of the power supplier 120, and may determine a required charging current value based on the determined output voltage value. When the determined output voltage value is less than the threshold voltage, the charging controller 240 may determine the charging mode to be the low-voltage charging mode. When the determined output voltage value is greater than or equal to the threshold voltage and when the required charging current value is less than the threshold current, the charging controller 240 may determine the charging mode to be the low-voltage charging mode. When the determined output voltage value is greater than or equal to the threshold voltage and when the required charging current value is greater than or equal to the threshold current, the charging controller 240 may determine the charging mode to be the high-voltage charging mode.

In operation 330, the charging controller 240 may control either one or both of the charger 230 and the switch network 270 when the charging mode is determined.

For example, the charging controller 240 may determine a required voltage value for the charger 230 based on the determined output voltage value and the determined charging mode, control the charger 230 based on the determined required voltage value, and control the switch network 270 based on the determined charging mode. In an example, when the output voltage value of the power supplier 120 is determined to be 15 V and the charging mode is determined to be the high-voltage charging mode, the charging controller 240 may determine the required voltage value for the charger 230 to be 10 V based on a voltage conversion ratio (for example, 1.5:1) of the high-voltage charging mode, and may control the charger 230 based on the determined required voltage value. In other words, when the output voltage value of the power supplier 120 is determined to be 15 V, the charging controller 240 may send a request or an instruction to the charger 230 such that an output voltage VDC of the charger 230 reaches 10 V. Also, the charging controller 240 may control the switch network 270 such that the first battery 250 and the second battery 260 are connected in series. In another example, when the output voltage value of the power supplier 120 is determined to be 9 V and the charging mode is determined to be the low-voltage charging mode, the charging controller 240 may determine the required voltage value for the charger 230 to be 4.5 V based on a voltage conversion ratio (for example, 2:1) of the low-voltage charging mode, and may control the charger 230 based on the determined required voltage value. In other words, when the output voltage value of the power supplier 120 is determined to be 9 V, the charging controller 240 may send a request or an instruction to the charger 230 such that an output voltage VDC of the charger 230 reaches 4.5 V. Also, the charging controller 240 may maintain a parallel connection relationship between the first battery 250 and the second battery 260.

When the output voltage value of the power supplier 120 is determined, the charging controller 240 may transmit the determined output voltage value to the power supplier 120 through the connector 210. In other words, the charging controller 240 may request the power supplier 120 to supply power corresponding to the determined output voltage value.

The power supplier 120 supplies the power corresponding to the determined output voltage value to the electronic apparatus 110, and the supplied power is input to the charger 230.

The charger 230 converts the supplied power and charges the first battery 250 and the second battery 260 based on the converted power. For example, in the high-voltage charging mode, when power of 15 V is supplied from the power supplier 120, the charger 230 may step down 15 V to a required voltage value of 10 V and may charge the first battery 250 and the second battery 260, while the first battery 250 and the second battery 260 are connected in series. In the low-voltage charging mode, when power of 9 V is supplied from the power supplier 120, the charger 230 may step down 9 V to a required voltage value of 4.5 V and may charge the first battery 250 and the second battery 260 while the first battery 250 and the second battery 260 are connected in parallel.

Figure 4:
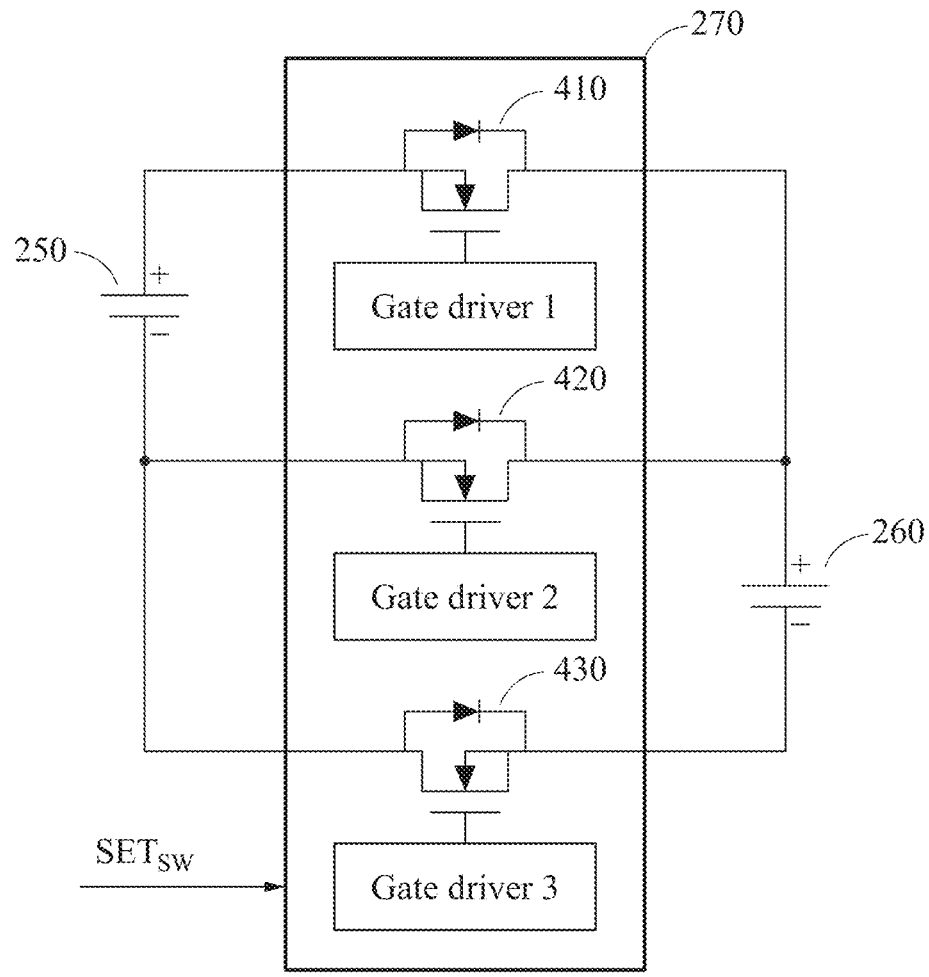
FIGS. 4 and 5 illustrate examples of a switch network in an electronic apparatus.
Figure 5:
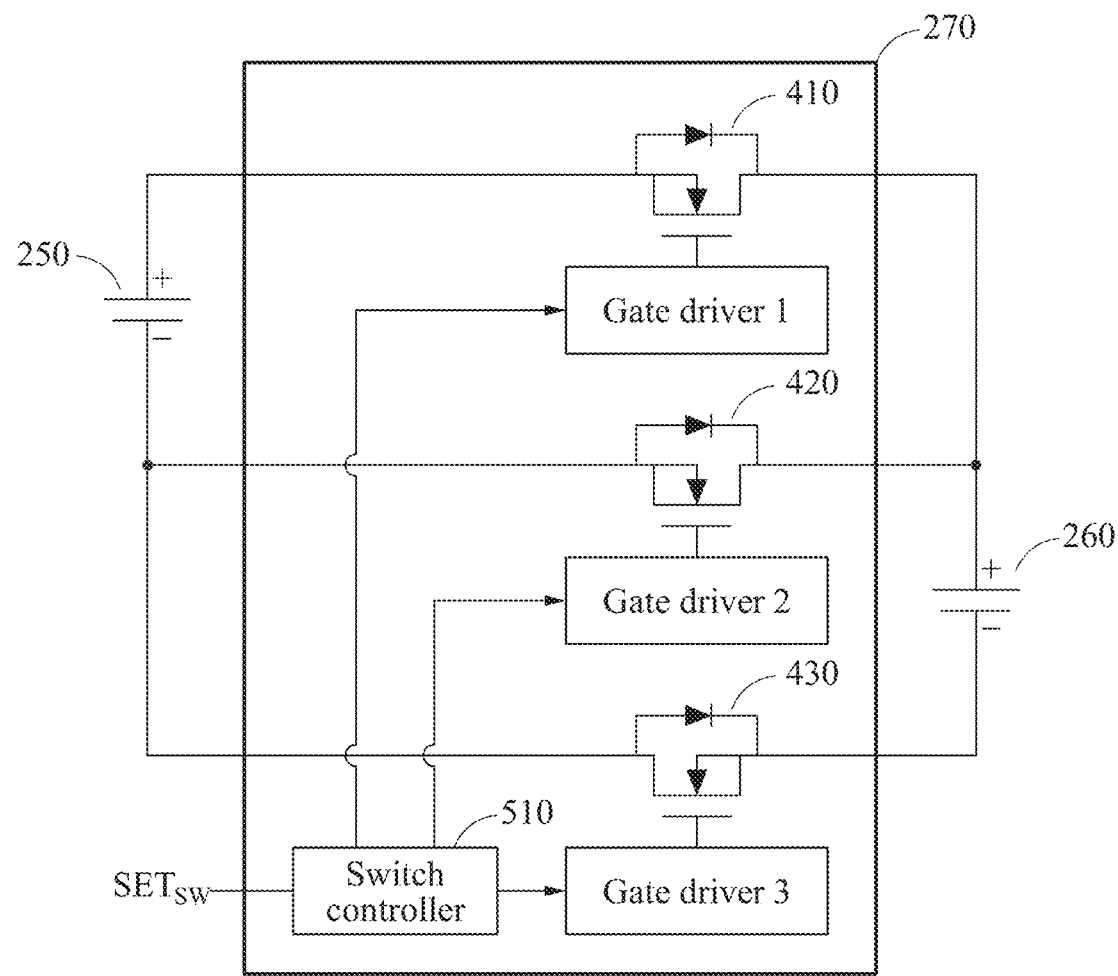

FIGS. 4 and 5 illustrate examples of the switch network 270 in the electronic apparatus 110.

Referring to FIG. 4, the switch network 270 may include a plurality of switches including a first switch 410, a second switch 420, and a third switch 430.

In a default configuration, for example, the first switch 420 is turned off and the second and third switches 410 and 430 are turned on. Thus, the first battery 250 and the second battery 260 are connected in parallel.

In the low-voltage charging mode, the parallel connection relationship between the first battery 250 and the second battery 260 is maintained, as described above.

In the high-voltage charging mode, the charging controller 240 controls the switch network 270 such that the first battery 250 and the second battery 260 are connected in series. In the example of FIG. 4, the charging controller 240 turns off the switch 410 using a gate driver 1, turns off the switch 430 using a gate driver 3, and turns on the switch 420 using a gate driver 2. Thus, in the high-voltage charging mode, the first battery 250 and the second battery 260 are connected in series.

When the first battery 250 and the second battery 260 are fully charged or charging is terminated in the high-voltage charging mode, the charging controller 240 may control the switch network 270 such that the first battery 250 and the second battery 260, which are connected in series, become connected in parallel. In the example of FIG. 4, the charging controller 240 turns on the switch 410 using the gate driver 1, turns on the switch 430 using the gate driver 3, and turns off the switch 420 using the gate driver 2. Thus, the first battery 250 and the second battery 260 are connected in parallel.

Referring to FIG. 5, the switch network 270 may further include a switch controller 510. For example, when a switching signal $SET_{SW}$ is received from the charging controller 240, the switch controller 510 controls each of the switches 410 through 430 based on the switching signal $SET_{SW}$. In an example, when the switching signal $SET_{SW}$ indicates a series connection between the first battery 250 and the second battery 260, the switch controller 510 may turn off the switch 410 using the gate driver 1, turn off the switch 430 using the gate driver 3, and turn off the switch 420 using the gate driver 2. Thus, the first battery 250 and the second battery 260 may be connected in series. In another example, when the switching signal $SET_{SW}$ indicates a parallel connection between the first battery 250 and the second battery 260, the switch controller 510 may turn on the switch 410 using the gate driver 1, turn on the switch 430 using the gate driver 3, and turn off the switch 420 using the gate driver 2. Thus, the first battery 250 and the second battery 260 may be connected in parallel.

Figure 6:
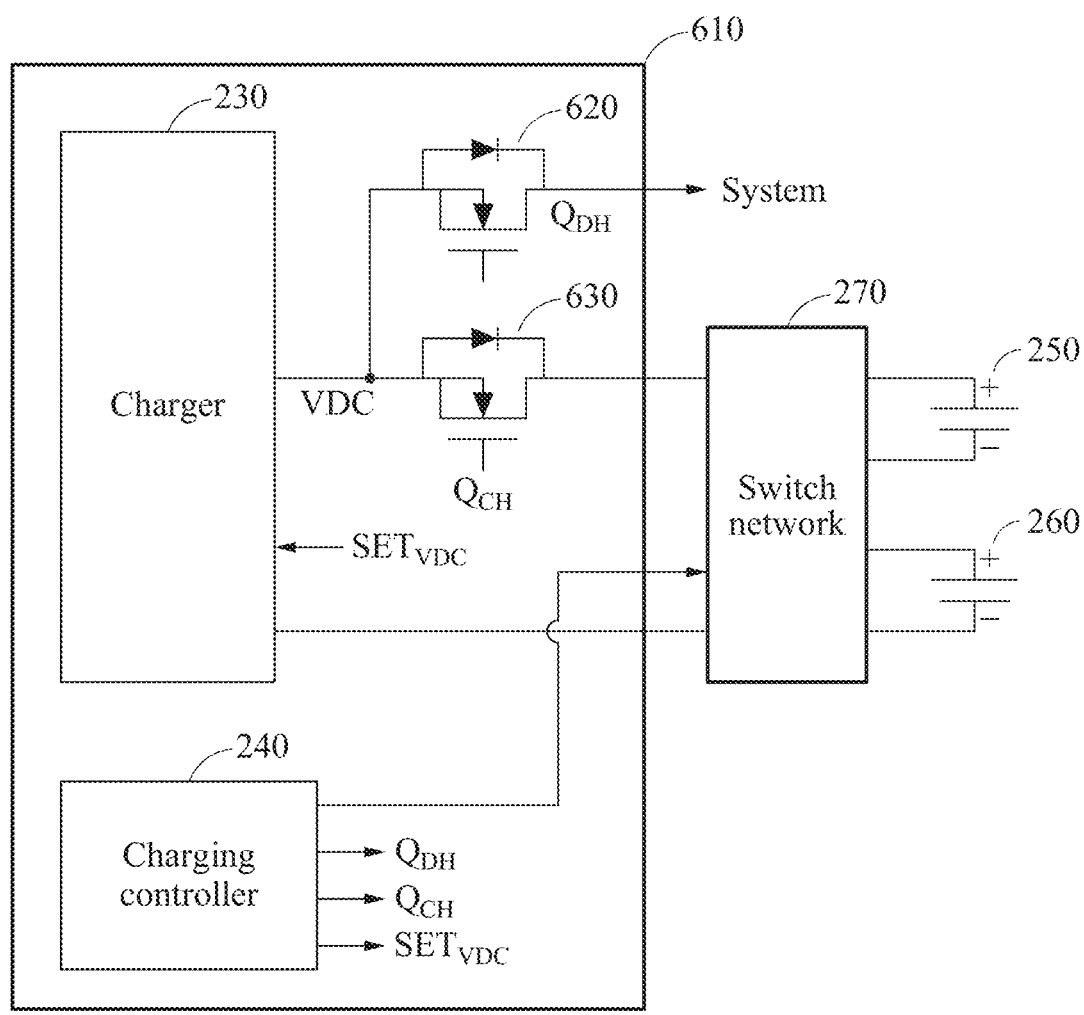
FIGS. 6 and 7 illustrate examples of charging circuits in an electronic apparatus.
Figure 7:
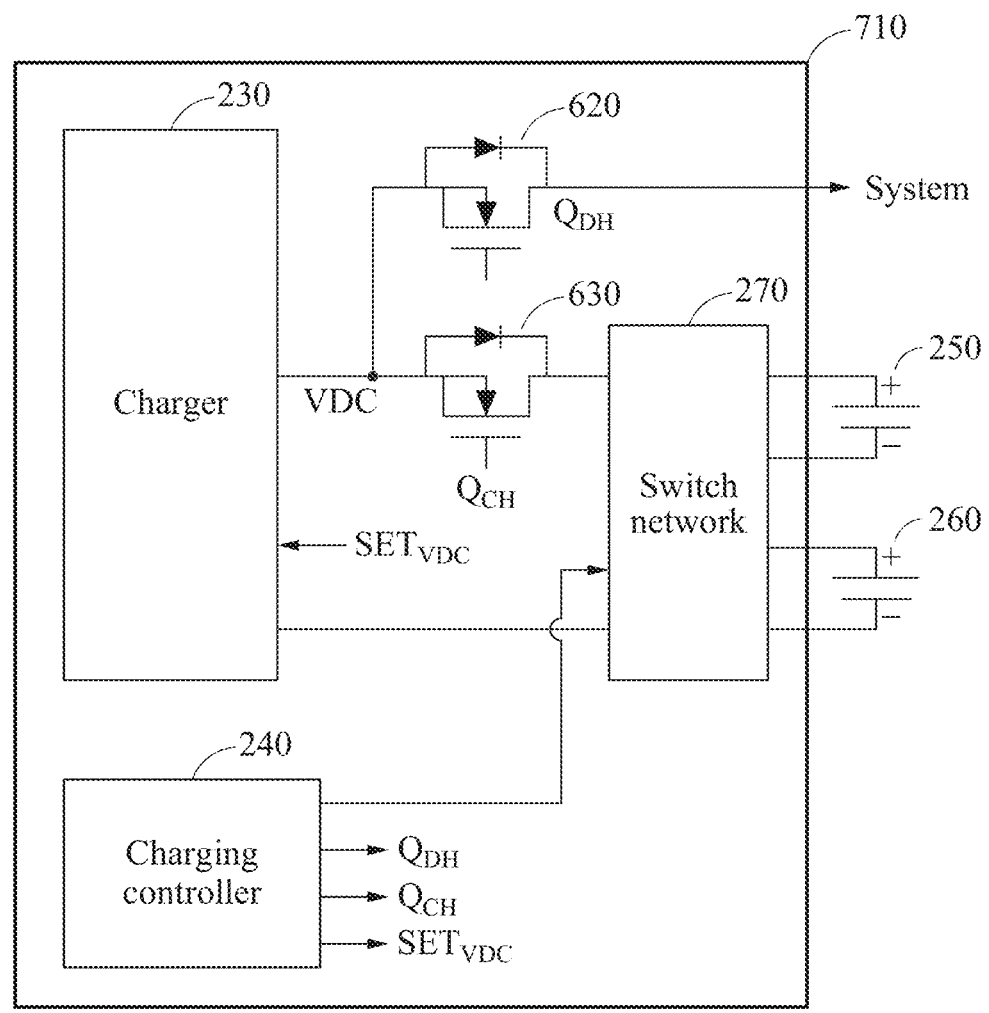

FIGS. 6 and 7 illustrate examples of charging circuits 610 and 710 in the electronic apparatus 110.

Referring to FIG. 6, the charging circuit 610 in the electronic apparatus 110 includes, for example, the charger 230, the charging controller 240, and switches 620 and 630. In the example of FIG. 6, the switch network 270 is disposed outside the charging circuit 610.

Referring to FIG. 7, the charging circuit 710 in the electronic apparatus 110 further includes the switch network 270, in comparison to the charging circuit 610. In other words, the charging circuit 710 includes the charger 230, the charging controller 240, the switch network 270, and the switches 620 and 630.

Each of the charging circuits 610 and 710 may be, for example, a charging power management integrated circuit (PMIC).

In the examples of FIGS. 6 and 7, the switch 620 electrically connects the charger 230 to a system or a load, and the switch 630 electrically connects the charger 230 to the first battery 250 and the second battery 260.

In the high-voltage charging mode, the charging controller 240 controls the switch network 270 to connect the first battery 250 and the second battery 260 in series, to turn on the switch 630 and to turn off the switch 620. In the low-voltage charging mode, the charging controller 240 turns on the switch 630 and turns off the switch 620.

According to an example, in the high-voltage charging mode or the low-voltage charging mode, the charging controller 240 may turn on the switch 620. For example, when a user uses the electronic apparatus 110, for example, when the user watches a video during charging of the electronic apparatus 110, in the high-voltage charging mode or the low-voltage charging mode, the charging controller 240 may turn on the switch 620 such that power may be supplied to a system, for example, a display or a processor. In this example, the first battery 250 and the second battery 260 may be charged more slowly than when the switch 620 is turned off.

Figure 8:
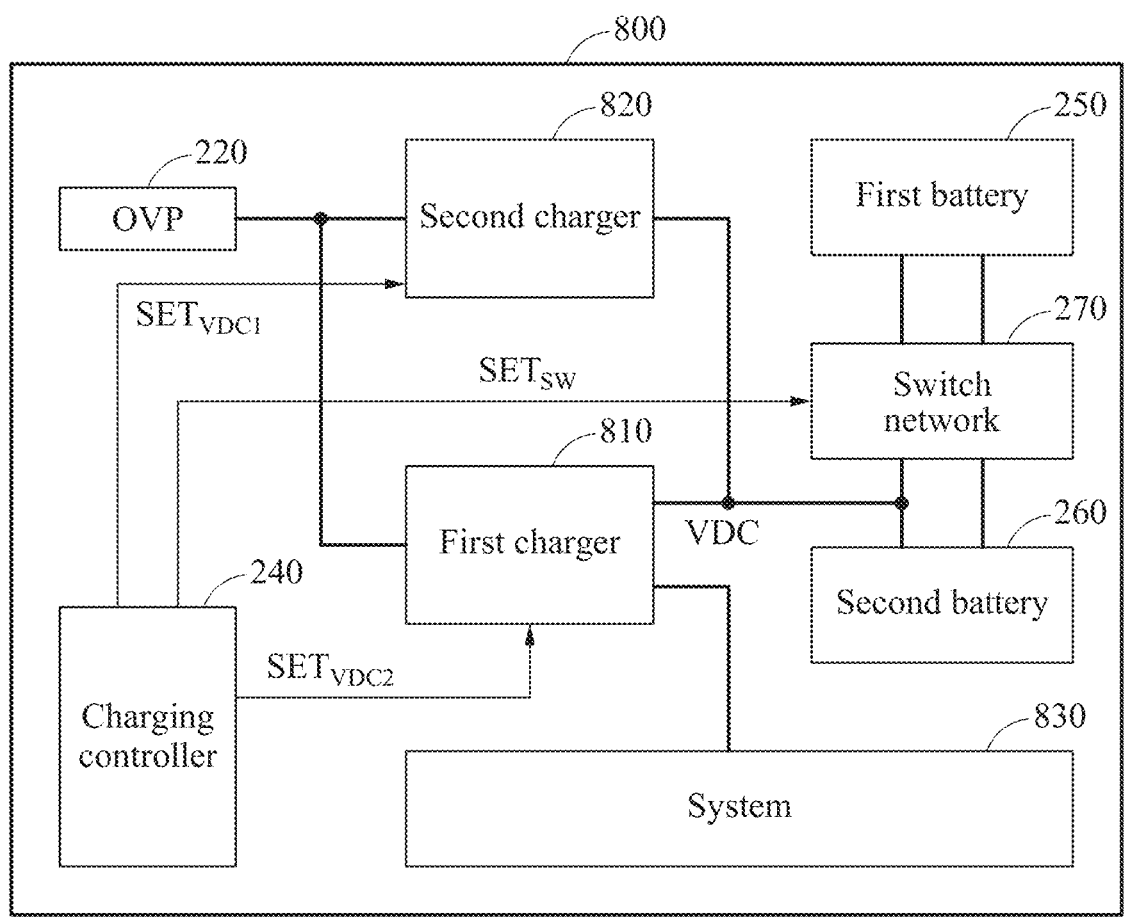
FIG. 8 illustrates an example of an operation of an electronic apparatus.

FIG. 8 illustrates an example of an operation of an electronic apparatus 800.

Referring to FIG. 8, the electronic apparatus 800 may include the connector 210, the OVP 220, a first charger 810, a second charger 820, the charging controller 240, the first battery 250, the second battery 260, the switch network 270 and a system 830. In the example of FIG. 8, the electronic apparatus 800 includes two batteries, that is, the first battery 250 and the second battery 260. However, the described configuration of the electronic apparatus 800 is merely an example, and the electronic apparatus 800 may include three or more batteries.

The electronic apparatus 800 may be, for example, a mobile electronic apparatus or a portable electronic apparatus. For example, the electronic apparatus 800 may be, but is not limited to, a smartphone or a tablet PC.

For example, the first charger 810 may include a step-down DC/DC converter, and the second charger 820 may include a 2:1 switched capacitor converter.

The system 830 includes a component configured to receive a power supply from the first battery 250 and the second battery 260. For example, the system 830 may include a memory, a display, or a processor that will be described below with reference to FIG. 10. However, the system is not limited to the described example components.

The charging controller 240 may control either one or both of the first charger 810 and the second charger 820 such that VDC is a required voltage value determined by the charging controller 240. In an example, when an output voltage value of the power supplier 120 is determined to be 15 V in a high-voltage charging mode, the charging controller 240 may determine the required voltage value to be 10 V, and may control either one or both of the first charger 810 and the second charger 820 such that VDC is 10 V. In this example, the charging controller 240 may control the switch network 270 such that the first battery 250 and the second battery 260 are connected in series. In another example, when the output voltage value of the power supplier 120 is determined to be 9 V in a low-voltage charging mode, the charging controller 240 may determine the required voltage value to be 4.5 V, and may control either one or both of the first charger 810 and the second charger 820 such that VDC is 4.5 V.

The above description of FIGS. 1 through 7 is also applicable to the example of FIG. 8. In the interest of conciseness, this description is not repeated herein with respect to FIG. 8.

Figure 9:
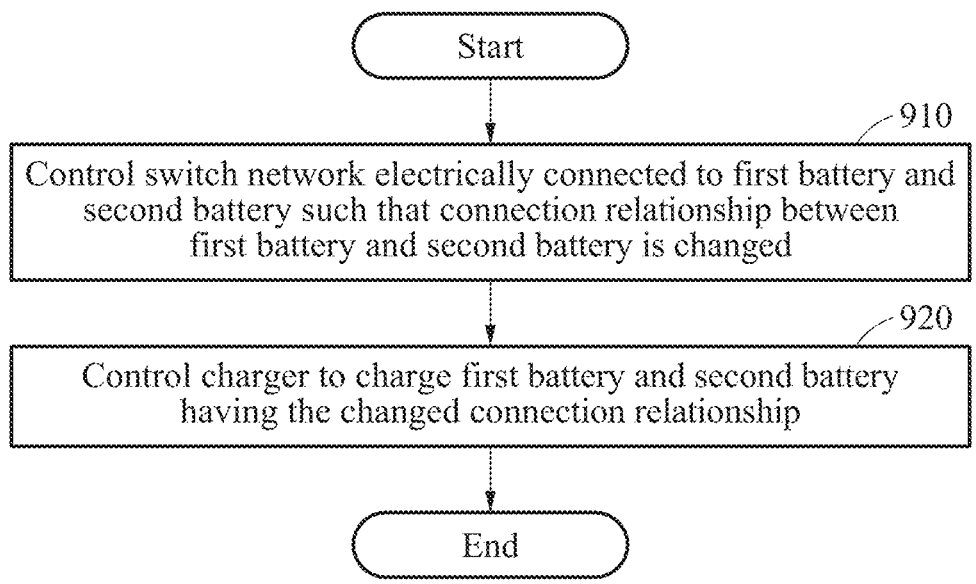
FIG. 9 is a flowchart illustrating an example of a method of charging an electronic apparatus.

FIG. 9 is a flowchart illustrating an example of a method of charging an electronic apparatus.

Referring to FIG. 9, in operation 910, the electronic apparatus 100/800 controls the switch network 270, which is electrically connected to the first battery 250 and the second battery 260, such that a connection relationship between the first battery 250 and the second battery 260 is changed. For example, the electronic apparatus 100/800 may change the connection relationship between the first battery 250 and the second battery 260 from a parallel connection relationship to a series connection relationship using the switch network 270 in a high-voltage charging mode.

In operation 920, the electronic apparatus 100/800 controls the charger 240/the first and second chargers 810 and 820, to charge the first battery 250 and the second battery 260, which have the changed connection relationship. For example, the electronic apparatus 100/800 may control the charger 240/the first and second chargers 810 and 820, to charge the first battery 250 and the second battery 260, which are connected to each other in series, with set high voltages in the high-voltage charging mode. The electronic apparatus 100/800 may control the charger 240/the first and second chargers 810 and 820 to charge the first battery 250 and the second battery 260, which are connected to each other in parallel, with set low voltages in a low-voltage charging mode.

When power is received from the power supplier 120, the electronic apparatus 100/800 charges the first battery 250 and the second battery 260. In the low-voltage charging mode, the electronic apparatus 100/800 charges the first battery 250 and the second battery 260 while the first battery 250 and the second battery 260 are connected to each other in parallel. In the high-voltage charging mode, the electronic apparatus 100/800 charges the first battery 250 and the second battery 260 while the first battery 250 and the second battery 260 are connected to each other in series.

The above description of FIGS. 1 through 8 is also applicable to the example of FIG. 9. In the interest of conciseness, this description is not repeated herein with respect to FIG. 9.

Figure 10:
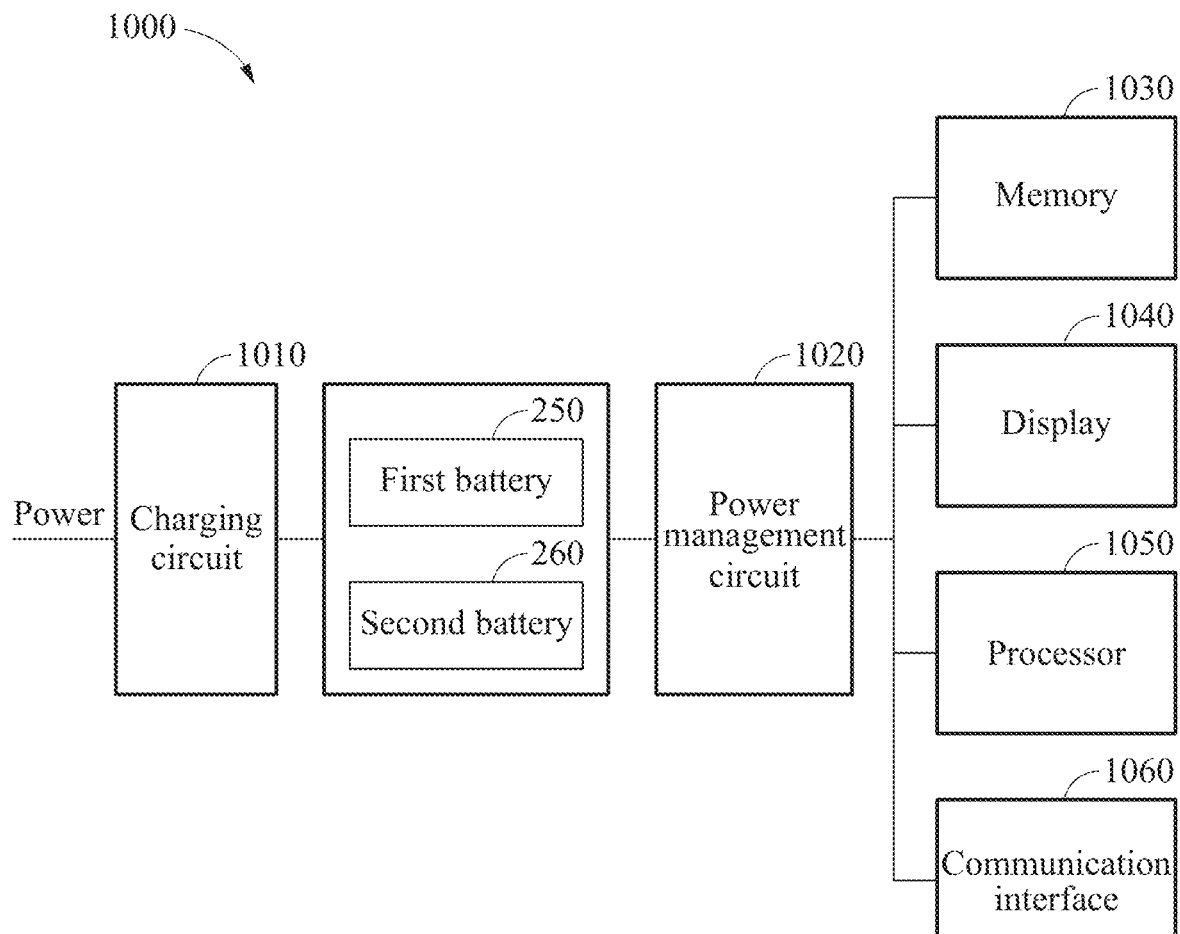
FIG. 10 is a block diagram illustrating an example of a configuration of an electronic apparatus.

FIG. 10 is a block diagram illustrating an example of a configuration of an electronic apparatus 1000.

Referring to FIG. 10, the electronic apparatus 1000 includes, for example, a charging circuit 1010, the first battery 250, the second battery 260, a power management circuit 1020, a memory 1030, a display 1040, a processor 1050, and a communication interface 1060.

A description of the electronic apparatus 1000 is applicable to each of the electronic apparatuses 100 and 800. Also, the description of the electronic apparatuses 100 and 800 is applicable to the electronic apparatus 1000.

For example, the charger 230 and the charging controller 240 of FIG. 2 are integrated in the charging circuit 1010. In another example, the charger 230, the charging controller 240, and the switch network 270 may be integrated in the charging circuit 1010.

The charging circuit 1010 may correspond to, for example, the charging circuit 610 of FIG. 6 or the charging circuit 710 of FIG. 7.

As described above, the first battery 250 and the second battery 260 are connected in series in the high-voltage charging mode, and are connected in parallel in the low-voltage charging mode.

The first battery 250 and the second battery 260 may supply power to any one or any combination of any two or more of the memory 1030, the display 1040, the processor 1050, and the communication interface 1060.

The power management circuit 1020 manages power supplied to the electronic apparatus 1000.

The power management circuit 1020 estimates a state of each of the first battery 250 and the second battery 260. For example, the power management circuit 1020 may collect sensing data, for example, any one or any combination of any two or more of voltage data, current data and temperature data, of each of the first battery 250 and the second battery 260. The power management circuit 1020 may estimate a state of each of the first battery 250 and the second battery 260 based on the sensing data of the first battery 250 and the second battery 260. A state of each battery may include, for example, any one or any combination of any two or more of a charging state, a life state, and an abnormal state. The abnormal state may include, for example, any one or any combination of any two or more of overvoltage, undervoltage, overcharging, overdischarging, overheating, and a short.

The power management circuit 1020 may perform a balancing of the first battery 250 and the second battery 260. For example, when a charging state of the first battery 250 and a charging state of the second battery 260 are not equal, the power management circuit 1020 may perform the balancing.

The power management circuit 1020 may be referred to as a "main PMIC" to be distinguished from the charging PMIC of FIGS. 6 and 7.

The memory 1030 may store at least one instruction executed by the processor 1050. Also, the memory 1030 may store data generated by the processor 1050. The memory 1030 may also store at least one application or software.

The display 1040 may display at least one piece of information. For example, the display 1040 may visually display an amount of power remaining in each of the first battery 250 and the second battery 260. Also, the display 1040 may visually display data executed by the processor 1050.

The processor 1050 may perform arithmetic logic operations and graphics processing. Also, the processor 1050 may execute an application or software and stores an execution result in the memory 1030 and/or visually displays the execution result on the display 1040.

The processor 1050 may perform an authentication. In an example, the processor 1050 may receive fingerprint data of a user using a fingerprint sensor, and may perform an authentication of the user based on the fingerprint data. In another example, the processor 1050 may receive face image data of a user using a camera, and may perform an authentication of the user based on the face image data.

The communication interface 1060 may enable the electronic apparatus 1000 to communicate with an external device. The communication interface 1060 includes, for example, any one or any combination of any two or more of a component configured to perform a mobile communication (for example, a fourth generation (4G) communication and/or a fifth generation (5G) communication), a component configured to perform a wireless fidelity (Wi-Fi) communication, a component configured to perform a near field communication (NFC), and a component configured to perform a Bluetooth communication.

Also, the electronic apparatus 1000 includes an output device, for example, a speaker or a vibration generator, configured to provide an output to a user, and an input device, for example, a microphone, configured to receive an input from the user.

Also, the electronic apparatus 1000 may include a sensor configured to sense bioinformation, for example, heart rate information, of a user.

The above description of FIGS. 1 through 9 is also applicable to the example of FIG. 10. In the interest of conciseness, this description is not repeated herein with respect to FIG. 10.

Figure 11:
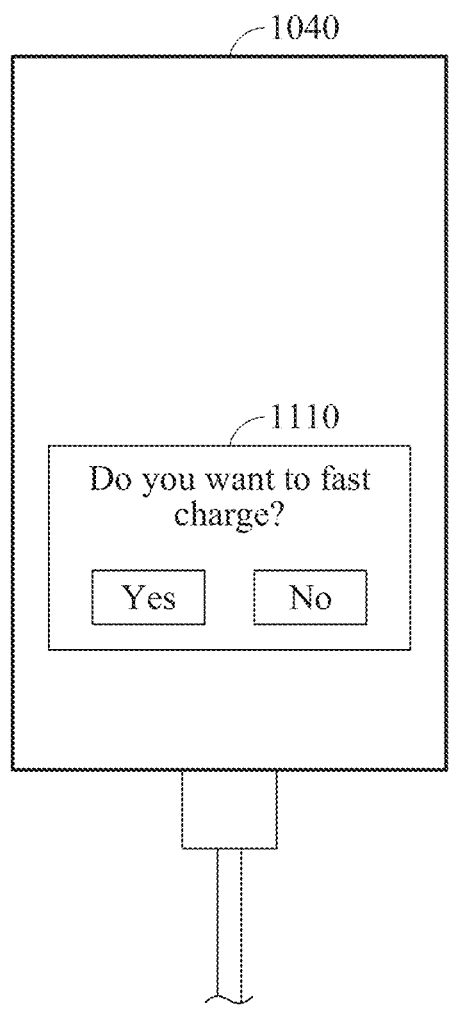
FIG. 11 illustrates an example of a charging indication of an electronic apparatus.

FIG. 11 illustrates an example of a charging indication of an electronic apparatus.

Referring to FIG. 11, the electronic apparatus 1000 may display, on the display 1040, an indication 1110 of whether to perform a fast charging. In an example in which the electronic apparatus 1000 is connected to the cable of the power supplier 120, the fast charging of the electronic apparatus 1000 may be determined to be applicable when a maximum output voltage of the power supplier 120 is greater than or equal to a threshold voltage (for example, 10 V) and when a relatively low amount of power remains in each of the first battery 250 and the second battery 260. The electronic apparatus 1000 may display the indication 1110 of whether to perform the fast charging on the display 1040 and may inquire whether a user wants to fast charge the electronic apparatus 1000. When the user selects "Yes" in the indication 1110, the electronic apparatus 1000 may be fast charged by changing the connection relationship between the first battery 250 and the second battery 260 from a parallel connection relationship to a series connection relationship. When the user selects "No" in the indication 1110, the electronic apparatus 1000 may charge the first battery 250 and the second battery 260 at a low speed, while the first battery 250 and the second battery 260 configured in the parallel connection relationship.

In an example, when fast charging of the electronic apparatus 1000 is determined to be applicable, an indication stating that fast charging is to be performed may be displayed on the display 1040.

The above description of FIGS. 1 through 10 is also applicable to the example of FIG. 11. In the interest of conciseness, this description is not repeated herein with respect to FIG. 11.

The power supplier 120, the OVP 220, the charger 230, the charging controller 240, the switch controller 510, the first charger 810, the second charger 820, the system 830, the memory 1030, the processor 1050, the communication interface 1060, the memories, the processors, and other components in FIGS. 1-11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic apparatus, comprising:
   batteries;
   a charger configured to charge the batteries;
   a switch network electrically connected to the batteries; and
   a charging controller configured to
      determine a first required voltage value of the charger based on a first conversion ratio and a first output voltage value of a power supplier in a first charging mode, wherein the batteries are in series connection in the first charging mode, and determine a second required voltage value of the charger based on a second conversion ratio different from the first conversion ratio and a second output voltage value of the power supplier in a second charging mode, wherein the batteries are in parallel connection in the second charging mode, wherein the charger is further configured to
in the first charging mode, convert a first power received from the power supplier to a second power based on the first required voltage value and charge, based on the second power, the batteries while the batteries are in the series connection, and in the second charging mode, convert a third power received from the power supplier to a fourth power based on the second required voltage value and charge, based on the fourth power, the batteries while the batteries are in the parallel connection.

2. The electronic apparatus of claim 1, wherein the charging controller is further configured to determine a charging mode to be the first charging mode in response to a determined charging current value being greater than or equal to a threshold current, and determine the charging mode to be the second charging mode in response to the determined charging current value being less than the threshold current.

3. The electronic apparatus of claim 1, wherein the charging controller is further configured to determine a charging mode to be the first charging mode in response to an output voltage value of the power supplier being greater than or equal to a threshold voltage and determine the charging mode to be the second charging mode in response to the output voltage value being less than the threshold voltage.

4. The electronic apparatus of claim 1, further comprising:
a first switch configured to electrically connect the charger and a load; and
a second switch configured to electrically connect the charger to the batteries.

5. The electronic apparatus of claim 4, wherein the charging controller is further configured to control the first switch to interrupt an electrical connection between the charger and the load in the first charging mode.

6. A method of charging an electronic apparatus, the method comprising:

determining a first required voltage value of a charger of the electronic apparatus based on a first conversion ratio and a first output voltage value of a power supplier in a first charging mode, wherein batteries of the electronic apparatus are in series connection in the first charging mode, determining a second required voltage value of the charger based on a second conversion ratio different from the first conversion ratio and a second output voltage value of the power supplier in a second charging mode, wherein the batteries are in parallel connection in the second charging mode, in the first charging mode, converting a first power received from the power supplier to a second power based on the first required voltage value and charging, based on the second power, the batteries while the batteries are in the series connection, and in the second charging mode, converting a third power received from the power supplier to a fourth power based on the second required voltage value and charging, based on the fourth power, the batteries while the batteries are in the parallel connection.

7. The method of claim 6, further comprising:
determining a charging mode to be the first charging mode in response to a determined charging current value being greater than or equal to a threshold current; and
determining the charging mode to be the second charging mode in response to the determined charging current value being less than the threshold current.

8. The method of claim 6, further comprising:
determining a charging mode to be the first charging mode in response to an output voltage value of the power supplier being greater than or equal to a threshold voltage; and
determining the charging mode to be the second charging mode in response to the output voltage value being less than the threshold voltage.

9. The method of claim 6, further comprising:
controlling a switch to interrupt an electrical connection between the charger and a load in the first charging mode.

10. A non-transitory computer-readable storage medium storing instructions that, when executed by one or more processors, configure the one or more processors to perform the method of claim 6.

* * * * *